United States Patent
Warnez et al.

(10) Patent No.: US 9,979,703 B2
(45) Date of Patent: May 22, 2018

(54) UPDATING SOFTWARE ON A SECURE ELEMENT

(71) Applicant: NXP B.V., Eindhoven (NL)

(72) Inventors: Dimitri Warnez, Hamburg (DE); Thierry Gouraud, Leuven (BE); Rafael Jan Josef Meeusen, Loenhout (BE); Andreas Lessiak, Graz (AT); Frank Siedel, Seevetal (DE); Ernst Haselsteiner, Graz (AT); Bruce Murray, Hamburg (DE)

(73) Assignee: NXP B.V., Eindhoven (NL)

(*) Notice: Subject to any disclaimer, the term of this patent is extended or adjusted under 35 U.S.C. 154(b) by 0 days. days.

(21) Appl. No.: 14/569,588

(22) Filed: Dec. 12, 2014

(65) Prior Publication Data

US 2015/0172255 A1 Jun. 18, 2015

(30) Foreign Application Priority Data

Dec. 13, 2013 (EP) .................................... 13290314

(51) Int. Cl.
*H04L 29/06* (2006.01)
*H04L 29/08* (2006.01)
(Continued)

(52) U.S. Cl.
CPC ............ *H04L 63/0428* (2013.01); *G06F 8/65* (2013.01); *G06F 21/572* (2013.01); *H04L 9/32* (2013.01);
(Continued)

(58) Field of Classification Search
CPC .......... G06F 21/51; G06F 21/57; G06F 21/64; G06F 21/572; H04L 9/32; H04L 9/3247;
(Continued)

(56) References Cited

U.S. PATENT DOCUMENTS

| | | | | |
|---|---|---|---|---|
| 6,128,737 A | * | 10/2000 | Jakubowski | .......... H04L 9/0637 380/259 |
| 6,226,742 B1 | * | 5/2001 | Jakubowski | .......... H04L 9/0625 380/37 |

(Continued)

FOREIGN PATENT DOCUMENTS

| | | |
|---|---|---|
| CN | 1615463 A | 5/2005 |
| CN | 1742247 A | 3/2006 |

(Continued)

OTHER PUBLICATIONS

Extended European Search Report for Patent Appln. No. 13290314.7 (dated Jun. 2, 2014).

(Continued)

*Primary Examiner* — Mohammad A Siddiqi

(57) ABSTRACT

There is disclosed a method of providing a software update to a secure element comprised in a host device, comprising converting the software update into a sequence of ciphertext blocks using a chained encryption scheme, and transmitting said sequence of ciphertext blocks to the host device. Furthermore, there is disclosed a method of installing a software update on a secure element comprised in a host device, comprising receiving, by the host device, a sequence of ciphertext blocks generated by a method of providing a software update of the kind set forth, converting said sequence of ciphertext blocks into the software update, and installing the software update on the secure element. Furthermore, corresponding computer program products and a corresponding host device are disclosed.

5 Claims, 8 Drawing Sheets

(51) Int. Cl.
*H04L 9/32* (2006.01)
*G06F 9/445* (2018.01)
*H04W 12/02* (2009.01)
*H04W 12/04* (2009.01)
*G06F 21/57* (2013.01)
*H04W 4/00* (2018.01)
*H04W 8/20* (2009.01)

(52) U.S. Cl.
CPC ............ *H04L 9/3247* (2013.01); *H04L 67/34* (2013.01); *H04W 4/001* (2013.01); *H04W 12/02* (2013.01); *H04W 12/04* (2013.01); *H04L 2463/062* (2013.01); *H04W 8/205* (2013.01)

(58) Field of Classification Search
CPC ............ H04L 63/0435; H04L 63/0428; H04L 2463/062; H04W 12/02; H04W 12/04; H04W 8/205
See application file for complete search history.

(56) References Cited

U.S. PATENT DOCUMENTS

| | | | | |
|---|---|---|---|---|
| 6,570,988 | B1* | 5/2003 | Venkatesan | H04L 9/0643 380/28 |
| 6,813,354 | B1* | 11/2004 | Jakobsson | H04L 9/3013 380/37 |
| 9,165,143 | B1* | 10/2015 | Sanders | G06F 21/575 |
| 9,208,335 | B2* | 12/2015 | Wu | G06F 21/6209 |
| 2006/0050870 | A1* | 3/2006 | Kimmel | H04L 63/0428 380/30 |
| 2007/0110237 | A1* | 5/2007 | Tehranchi | G06T 1/0035 380/201 |
| 2008/0022361 | A1* | 1/2008 | Bharadwaj | G06F 21/6209 726/2 |
| 2008/0212770 | A1* | 9/2008 | Satou | H04L 9/0637 380/44 |
| 2009/0067685 | A1* | 3/2009 | Boshra | G06F 21/32 382/124 |
| 2009/0088133 | A1* | 4/2009 | Orlassino | H04L 63/08 455/411 |
| 2010/0124328 | A1* | 5/2010 | Schneider | H04L 9/0618 380/42 |
| 2010/0134848 | A1* | 6/2010 | Lynggaard | G06F 3/03545 358/3.28 |
| 2010/0153745 | A1* | 6/2010 | Onno | G06F 21/125 713/190 |
| 2010/0158243 | A1* | 6/2010 | Tian | H04L 9/0637 380/37 |
| 2011/0103580 | A1* | 5/2011 | Hazay | H04L 69/04 380/28 |
| 2011/0138192 | A1* | 6/2011 | Kocher | G06F 21/602 713/189 |
| 2011/0243328 | A1* | 10/2011 | Paillier | H04L 9/3073 380/255 |
| 2012/0250856 | A1* | 10/2012 | Pasini | H04L 9/0637 380/37 |
| 2013/0010957 | A1* | 1/2013 | Yu | H04L 9/0866 380/260 |
| 2013/0238581 | A1* | 9/2013 | Franzki | G06F 21/602 707/705 |
| 2013/0339753 | A1* | 12/2013 | Shibutani | H04L 9/0625 713/189 |
| 2014/0047235 | A1 | 2/2014 | Lessiak et al. | |
| 2015/0263858 | A1* | 9/2015 | Aumasson | H04L 9/0637 380/30 |
| 2016/0226658 | A1* | 8/2016 | Howard | H04L 9/0637 |

FOREIGN PATENT DOCUMENTS

| | | |
|---|---|---|
| DE | 199 25 389 A1 | 12/2000 |
| WO | 03/060673 A1 | 7/2003 |
| WO | WO-03/060673 A1 | 7/2003 |
| WO | WO-2004/070587 A1 | 8/2004 |
| WO | 2007/014314 A2 | 2/2007 |
| WO | 2012/109640 A2 | 8/2012 |

OTHER PUBLICATIONS

"SLE97400SE/SD—Secure Element featuring JavaCard 3.0.1/Global Platform 2.2.1 Operating System", Infineon, 2 pgs, retrieved from the internet at: http://www.infineon.com/dgdl?folderId=db3a3043341f67a101343be2a35d1f46&fileId=db3a3043341f67a101343be446141f48 (2011).

* cited by examiner

PTx: Plain text block
CTx: Cipher text block
Kx: Key

CTx: Cipher text block
Hx: Hash
S: Signature

UPDATING SOFTWARE ON A SECURE ELEMENT

CROSS-REFERENCE TO RELATED APPLICATIONS

This application claims the priority under 35 U.S.C. § 119 of European patent application no. 13290314.7, filed on Dec. 13, 2013, the contents of which are incorporated by reference herein.

FIELD

The present disclosure relates to a method of providing a software update to a secure element comprised in a host device. Furthermore, the present disclosure relates to a method of installing a software update on a secure element comprised in a host device. Furthermore, the present disclosure relates to corresponding computer program products and to a corresponding host device.

BACKGROUND

Today, security plays an important role in many electronic devices and computing environments. For example, conventional mobile electronic devices may be used for payment transactions which require that sensitive payment-related data, such as user credentials, are input and/or stored on said devices. Such mobile electronic devices may for instance be equipped with a near field communication (NFC) interface based on radio frequency (RF) technology, in order to exchange payment-related data with a payment terminal device at a point-of-sale (POS).

Traditionally, sensitive payment-related data have been incorporated into dedicated security tokens such as smart cards, in which the data are inherently confined to a relatively trusted environment. However, with the advent of integrated solutions, in particular the integration of so-called secure elements (SEs) in mobile devices, payment-related data are often exposed to a potentially hostile environment, and therefore the confidentiality of these data may be at stake.

A secure element is often implemented as an embedded chip, more specifically as a tamper-resistant integrated circuit with (pre-) installed smart-card-grade applications, for instance payment applications, which have a prescribed functionality and a prescribed level of security. Alternatively, so-called Subscriber Identity Modules (SIMs) or Universal Subscriber Identity Modules (USIMs) may be used as secure elements. Furthermore, secure digital (SD) cards, such as traditional SD cards or micro-SD cards, may be used as secure elements. A secure element may be embedded in a mobile device or another host device, for example as a small outline package soldered directly on a printed circuit board. Alternatively, a secure element may be comprised in said mobile device as a removable component (e.g. a SIM or an SD card).

Although a secure element offers a relatively secure environment for executing applications, it is relatively difficult to achieve and maintain this level of security, for example when operating components of the secure element need to be installed and/or configured. In particular if the software installed on a secure element needs to be updated, for example the secure element's operating system, then the secure element may be susceptible to attacks. Although many techniques exist for providing secure software updates, these techniques usually do not address updating software on secure elements of the kind set forth. For example, WO 2012/109640 A2 describes a secure software update that provides an update utility with an update definition, a private encryption key and a public signature key to a target device. A software update package is prepared on portable media that includes an executable update program, a checksum for the program that is encrypted with a symmetrical key, an encrypted symmetrical key that is encrypted with a public encryption key and a digital signature prepared with a private signature key. The update process authenticates the digital signature, decrypts the symmetrical key using the private encryption key, and decrypts the checksum using the symmetrical key. A new checksum is generated for the executable update program and compared to the decrypted checksum. If inconsistencies are detected during the update process, the process is terminated. Otherwise, the software update can be installed with a relatively high degree of assurance against corruption, viruses and third party interference.

As another example, WO 2007/014314 A2 describes improved techniques to update software in electronic devices that are already in use. In one embodiment, software can be updated in a secure and controlled manner using cryptography. The authenticity of the updated software as well as its appropriateness for the particular electronic device can be confirmed prior to update. The software can also be updated on a per module basis. In one embodiment, a server hosts software updates for various electronic devices, and supplies the appropriate software update to the electronic devices via a data network.

FIG. 1 shows a conventional computing system in which a secure element is used. The computing system 100 comprises a host device 102, a host device vendor 108, a trusted service manager 110, and a secure element issuer 112. The host device 102 may for example be a so-called smart phone or a tablet equipped with NFC technology, as described above. The host device 102 comprises a central processing unit 104 and a secure element 106.

In order to prepare the computing system 100 for use, the secure element issuer 112 issues a secure element 106 for integration into the host device 102. In addition, the secure element issuer 112, or the secure element producer (not shown) on their behalf, installs an initial version of an operating system on the secure element 106. It is noted that the operating system of the secure element 106 is referred to as "Secure OS" in the remainder of this document. Furthermore, the host device vendor 108 installs an initial version of an operating system of the host device 102 in the host device 102, typically in a Flash memory (not shown) of said host device 102. It is noted that the operating system of the host device 102 is referred to as "Host OS" in the remainder of this document.

In use, both the Secure OS and the Host OS may have to be updated, for example in order to provide additional security features or other functionality. Typically, the host device vendor 108 is responsible for installing updates of the Host OS on the host device 102. For example, many host devices are nowadays configured to automatically receive and install broadcasted updates of the Host OS. An example of such a regularly updated Host OS is the Android operating system. The Secure OS may also have to be updated on a regular basis. However, in this case, a third party referred to as a trusted service manager (TSM) 110 typically acts as an intermediate for installing updates of the Secure OS. In particular, since the secure element issuer 112 no longer has access to secure elements which are already in the field (i.e. in use), it provides updates of the Secure OS to the trusted service manager 110. Subsequently, the trusted service manager 110 manages the installation of the Secure OS updates on the secure element 106.

Unfortunately, however, the mechanisms used to install these updates on the secure element 106 are typically quite cumbersome. In particular, they rely on hardware-specific encryption methods which are complicated and inflexible. Also, they typically require setting up secure point-to-point communication channels between secure elements and trusted service managers. In view thereof, there exists a need to facilitate and simplify the installation of operating system updates on secure elements. It is noted that the same problem may occur if other software updates have to be installed on secure elements; in other words, this problem is not limited to updates of the Secure OS. Thus, in more general terms, there exists a need to facilitate and simplify the installation of software updates on secure elements of the kind set forth.

SUMMARY

There is disclosed a method of providing a software update to a secure element comprised in a host device, comprising converting the software update into a sequence of ciphertext blocks using a chained encryption scheme, and transmitting said sequence of ciphertext blocks to the host device.

According to an illustrative embodiment, converting the software update comprises generating each ciphertext block of the sequence, except the first ciphertext block, by encrypting a plaintext block that comprises a part of the software update.

According to a further illustrative embodiment, the plaintext block is encrypted with a key that is comprised in a previous ciphertext block of the sequence.

According to a further illustrative embodiment, the first ciphertext block of the sequence is generated by encrypting, with a root key, a key to be used for generating the second ciphertext block of the sequence.

According to a further illustrative embodiment, the sequence of ciphertext blocks is cryptographically signed before it is transmitted to the host device.

According to a further illustrative embodiment, said sequence of ciphertext blocks is integrated into a software update for the host device.

Furthermore, there is disclosed a computer program product comprising program instructions which, when being executed by a processing unit, cause said processing unit to carry out or control steps of a method of providing a software update of the kind set forth.

Furthermore, there is disclosed a method of installing a software update on a secure element comprised in a host device, comprising receiving, by the host device, a sequence of ciphertext blocks representing the software update, said sequence having been generated by a method of providing a software update of the kind set forth, converting said sequence of ciphertext blocks into the software update, and installing the software update on the secure element.

According to a further illustrative embodiment, converting the sequence of ciphertext blocks comprises extracting a plaintext block that comprises a part of the software update from each ciphertext block of the sequence, except the first ciphertext block.

According to a further illustrative embodiment, extracting a plaintext block from a ciphertext block comprises decrypting the ciphertext block with a key that is comprised in a previous ciphertext block of the sequence.

According to a further illustrative embodiment, before extracting a plaintext block from each ciphertext block except the first ciphertext block, the first ciphertext block is decrypted with a root key in order to unlock a key for decrypting the second ciphertext block of the sequence.

According to a further illustrative embodiment, a cryptographic signature of the sequence of ciphertext blocks is verified before the sequence of ciphertext blocks is converted.

According to a further illustrative embodiment, said sequence of ciphertext blocks is extracted from a software update for the host device.

Furthermore, there is disclosed a computer program product comprising program instructions which, when being executed by a processing unit, cause said processing unit to carry out or control steps of a method of installing a software update of the kind set forth.

Furthermore, there is disclosed a host device comprising a secure element, said host device being arranged to perform a method of installing a software update of the kind set forth.

DESCRIPTION OF DRAWINGS

Embodiments will be described in more detail with reference to the appended drawings, in which.

DESCRIPTION OF EMBODIMENTS

Figure 1:
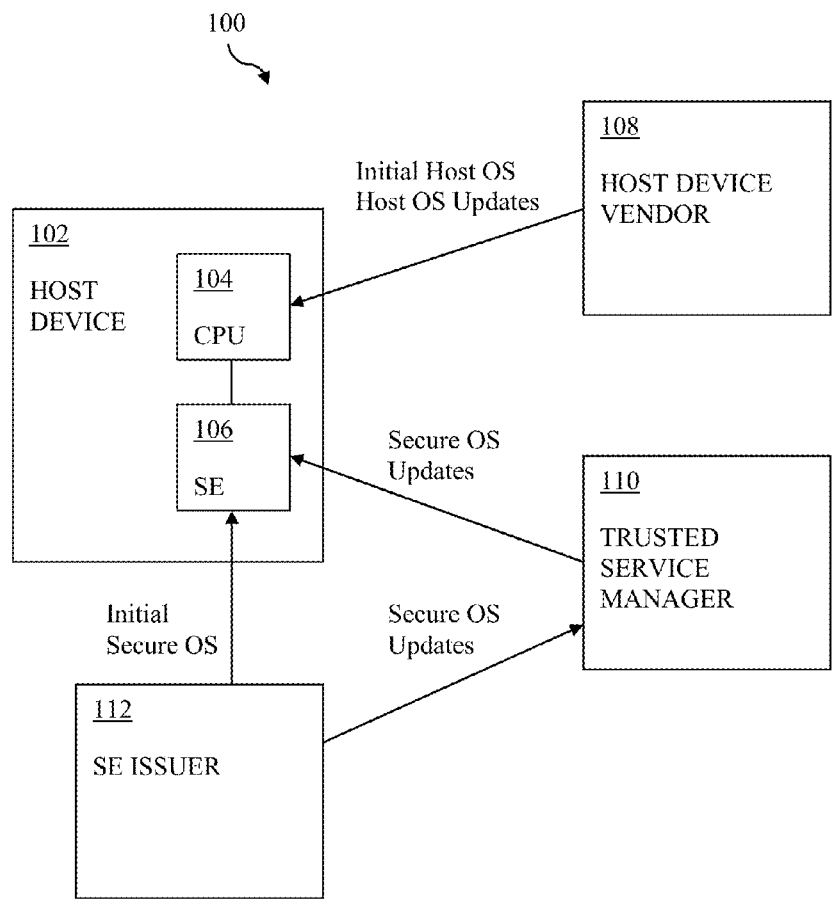
FIG. 1 shows a conventional computing system in which a secure element is used.
Figure 2:
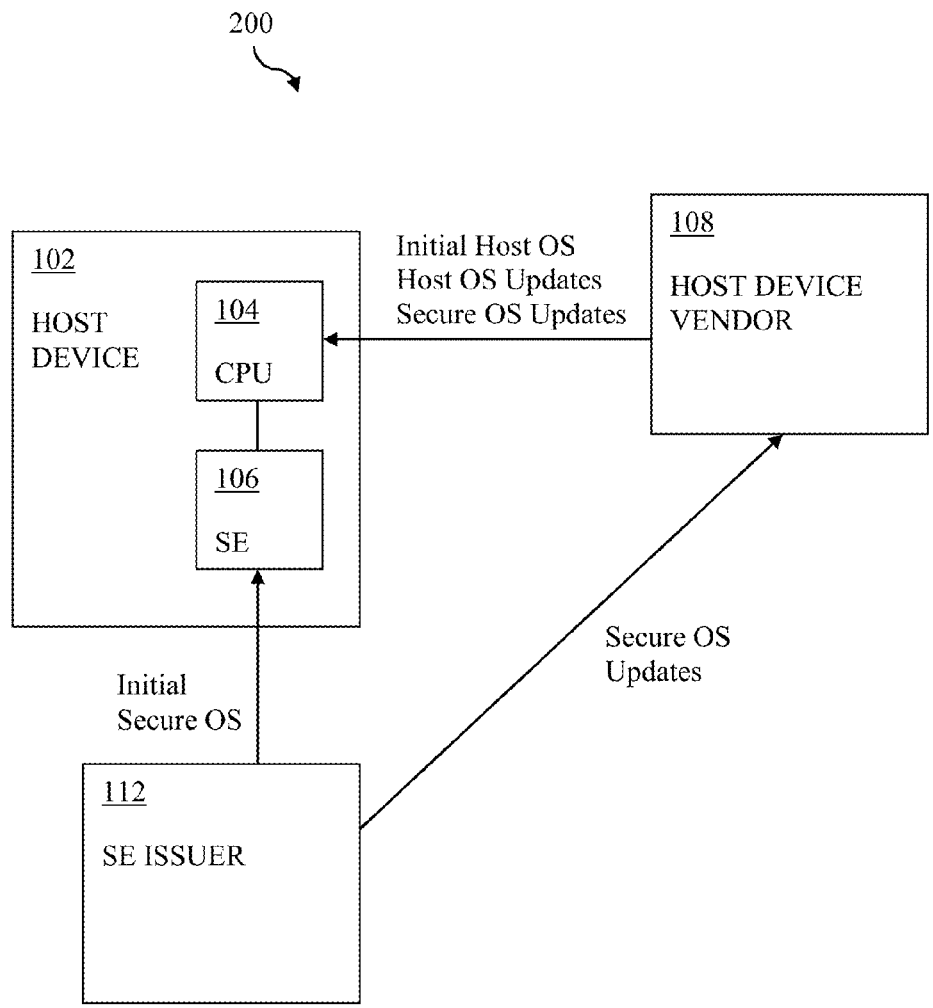
FIG. 2 shows an illustrative embodiment of a computing system in accordance with the present disclosure.

FIG. 2 shows an illustrative embodiment of a computing system in accordance with the present disclosure. Again, the computing system 200 comprises a host device 102 (including a central processing unit 104 and a secure element 106), a host device vendor 108 and a secure element issuer 112. However, in contrast with the conventional computing system of FIG. 1, the computing system 200 does not comprise a trusted service manager. That is to say, updates of the Secure OS may be provided and installed via the host device vendor 108. Thereby, there is no need for a trusted service manager or other third party, and thus the installation of said updates is simplified. In order to maintain an adequate security level, updates of the Secure OS comprise sequences of ciphertext blocks based on a chained encryption scheme. A Secure OS update may be broadcasted by the host device vendor 108 to the host device 102 as a software package or a software image containing said sequence of ciphertext blocks. Thus, contrary to conventional software updates for secure elements, the same software package or software image may be broadcasted to many host devices, and there is no need for setting up secure point-to-point communication channels between secure elements and trusted service managers. A host device 102 reassembles a Secure OS update and subsequently installs the Secure OS update on the secure element 106. Thus, the upgrade of the operating system of the secure element 106 is effectively done in a broadcasted way. It is emphasized that other types of software updates for the secure element may be provided and installed in the same way. That is to say, the present disclosure is not limited to updates of the Secure OS, but it also applies to other types of software updates.

Figure 3:
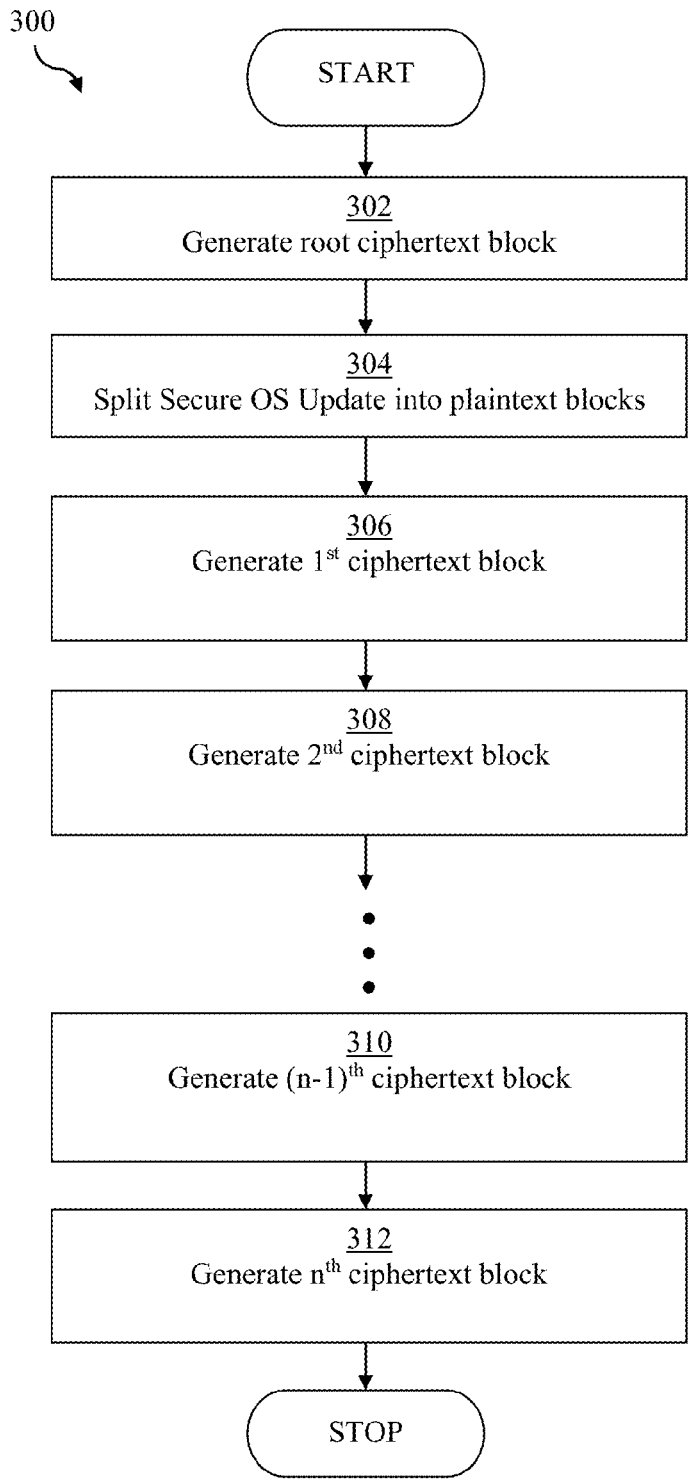
FIG. 3 shows an illustrative embodiment of an encryption method.

FIG. 3 shows an illustrative embodiment of an encryption method. The Secure OS update may comprise a sequence of ciphertext blocks which may be encrypted by means of this encryption method 300. According to this illustrative embodiment, the encryption method 300 comprises the following steps. First, a root ciphertext is generated 302 by encrypting a first key with a root key. Basically, the root ciphertext contains an encrypted version of the key that will be used for encrypting the first ciphertext block that contains a part of the Secure OS update. Second, the Secure OS update is split 304 into parts, i.e. into plaintext blocks that each contain a part of the software, i.e. the Secure OS update. Next, the first ciphertext block of the sequence is generated 306 by concatenating a first plaintext block and a second key and encrypting the result of this concatenation with the first key. In this way, the second key, which will be used for encrypting the next (i.e. the second) plaintext block, is comprised in the first ciphertext block. Next, the second ciphertext block is generated 308 by concatenating the second plaintext block and a third key and encrypting the result of this concatenation with the second key. This process is repeated for all plaintext blocks. Thus, assuming that there are n plaintext blocks, then the last but one step comprises generating 310 the $(n-1)^{th}$ ciphertext block by concatenating the $(n-1)^{th}$ plaintext block and an $n^{th}$ key and encrypting the result of this concatenation with an $(n-1)^{th}$ key. Furthermore, the last step comprises generating 312 the $n^{th}$ ciphertext block by encrypting the $n^{th}$ plaintext block with the $n^{th}$ key.

In this way, the Secure OS update effectively comprises a sequence of ciphertext blocks which can either be broadcasted directly as a software package or software image, or which can easily be integrated into a Host OS update, for example by embedding or interleaving said ciphertext blocks into/with the data that constitute the Host OS update. Furthermore, since every key is used only once, the security risks that might arise when broadcasting the Secure OS update are effectively mitigated. It is noted that methods for integrating one set of data into another are known as such. That is to say, if the ciphertext blocks are to be integrated into the Host OS update (or into another software update for the host device), then the skilled person may apply any suitable method to integrate said ciphertext blocks.

The ciphertext blocks may for example be formatted as so-called application protocol data units (APDUs). An APDU is a commonly used communication unit for exchanging data between smart cards—i.e. real or emulated smart cards—and smart card readers. Thus, the Secure OS update may either comprise a software package or software image constituted by sequence of APDUs, or a sequence of APDUs embedded into or interleaved with data units of the Host OS update. The data units of the Host OS update may, in turn, also be formatted as APDUs. Furthermore, it is noted that the encryption method may be carried out by the secure element issuer 112, for example in a secure environment, or, if appropriate, by the host device vendor 108 on behalf of the secure element issuer 112. The encryption method may be embodied in a computer program which is executable by a processing unit owned by the secure element issuer 112 or the host device vendor 108, as the case may be.

Figure 4:
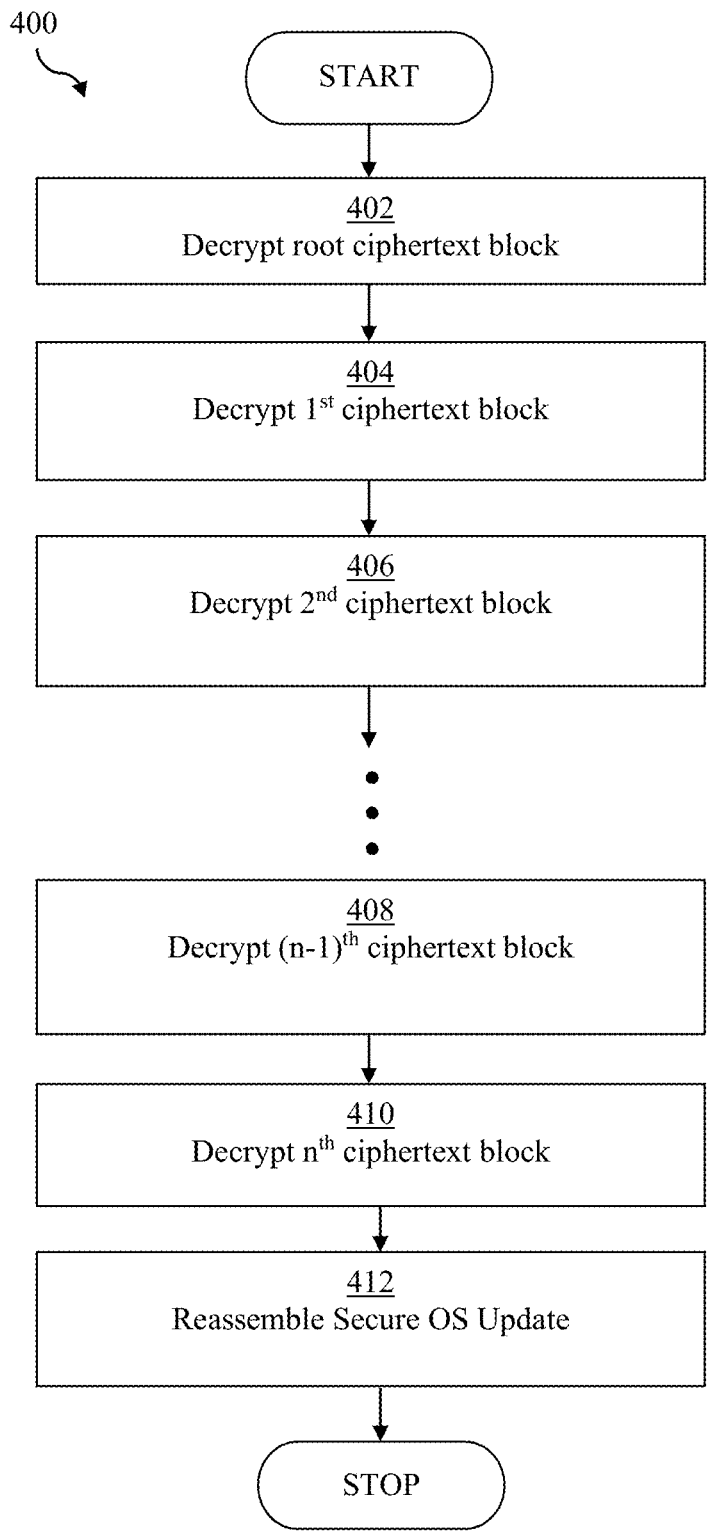
FIG. 4 shows an illustrative embodiment of a decryption method.

FIG. 4 shows an illustrative embodiment of a decryption method. Basically, the decryption method 400 mirrors the encryption method 300 shown in FIG. 3. The host device 102 executes the decryption method 400. More specifically, the actual decryption may be performed by the secure element 106, at least partially under the control of the central processing unit 104, for example. In this way, a reasonable level of security may be achieved. According to this illustrative embodiment, the decryption method 400 comprises the following steps. First, the root ciphertext block is decrypted 402 with the root key, which results in the first key. The root key may have been stored in the secure element 106 by the secure element issuer 112, or by the secure element producer on his behalf, before or during installation, for example, and it may have been agreed upon and shared with the host device vendor 108 using an appropriate protocol, such as the Diffie-Hellman key agreement protocol. Second, the first ciphertext block—i.e. the first ciphertext block of the sequence that actually contains a part of the Secure OS update—is decrypted 404 with the first key, which results in the first plaintext block and the second key. Next, the second ciphertext block is decrypted 406 with the second key, which results in the second plaintext block and the third key. This process is repeated for all ciphertext blocks. Thus, assuming that there are n ciphertext blocks, then the last but one decryption step comprises decrypting 408 the $(n-1)^{th}$ ciphertext block with the $(n-1)^{th}$ key, which results in the $(n-1)^{th}$ plaintext block and the $n^{th}$ key. The last decryption step comprises decrypting 410 the $n^{th}$ ciphertext block with the $n^{th}$ key, which results in the $n^{th}$ plaintext block. At this stage, a sequence of n plaintext blocks has become available. These plaintext blocks are reassembled 412 in a final step, thereby yielding the Secure OS update. It is noted that the final step of reassembling the Secure OS update is not an actual decryption step, but it is the counterpart of the step of splitting the Secure OS update in the encryption method of FIG. 3.

Figure 5:
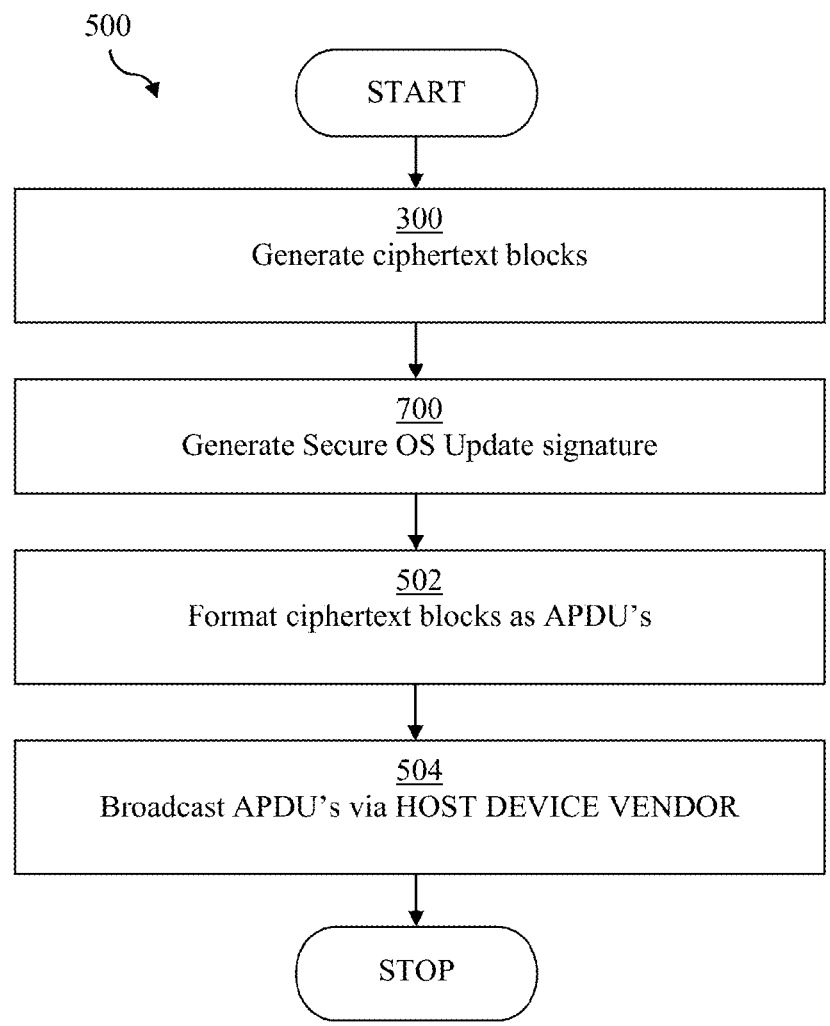
FIG. 5 shows an illustrative embodiment of a communication method.

FIG. 5 shows an illustrative embodiment of a communication method. As a first step of the communication method 500, ciphertext blocks are generated by means of the encryption method 300 shown in FIG. 3. Subsequently, a Secure OS update signature is generated by means of a signing method 700, which will be explained in detail with reference to FIG. 7. Next, the ciphertext blocks are formatted 502 as APDUs. Finally, the APDUs are broadcasted 504, for example in the form of a software package or a software image, via the host device vendor 108 to the host device 102. It is noted that the mapping of these steps to the functional units of the computing system 200 may take different forms. That is to say, as mentioned above, that the encryption method 300 may for example be carried out by the secure element issuer 112 or, if appropriate, by the host device vendor 108 on behalf of the secure element issuer 112. The same applies to generating 700 the Secure OS update signature and formatting 502 the ciphertext blocks as APDUs. The broadcasting step 504 is in this example performed by the host device vendor 108; in order to facilitate said broad-casting the host device vendor 108 may integrate the APDUs into the Host OS update, as explained above. This integration also increases the user friendliness of the system, because the host device will receive less software updates.

Figure 6:
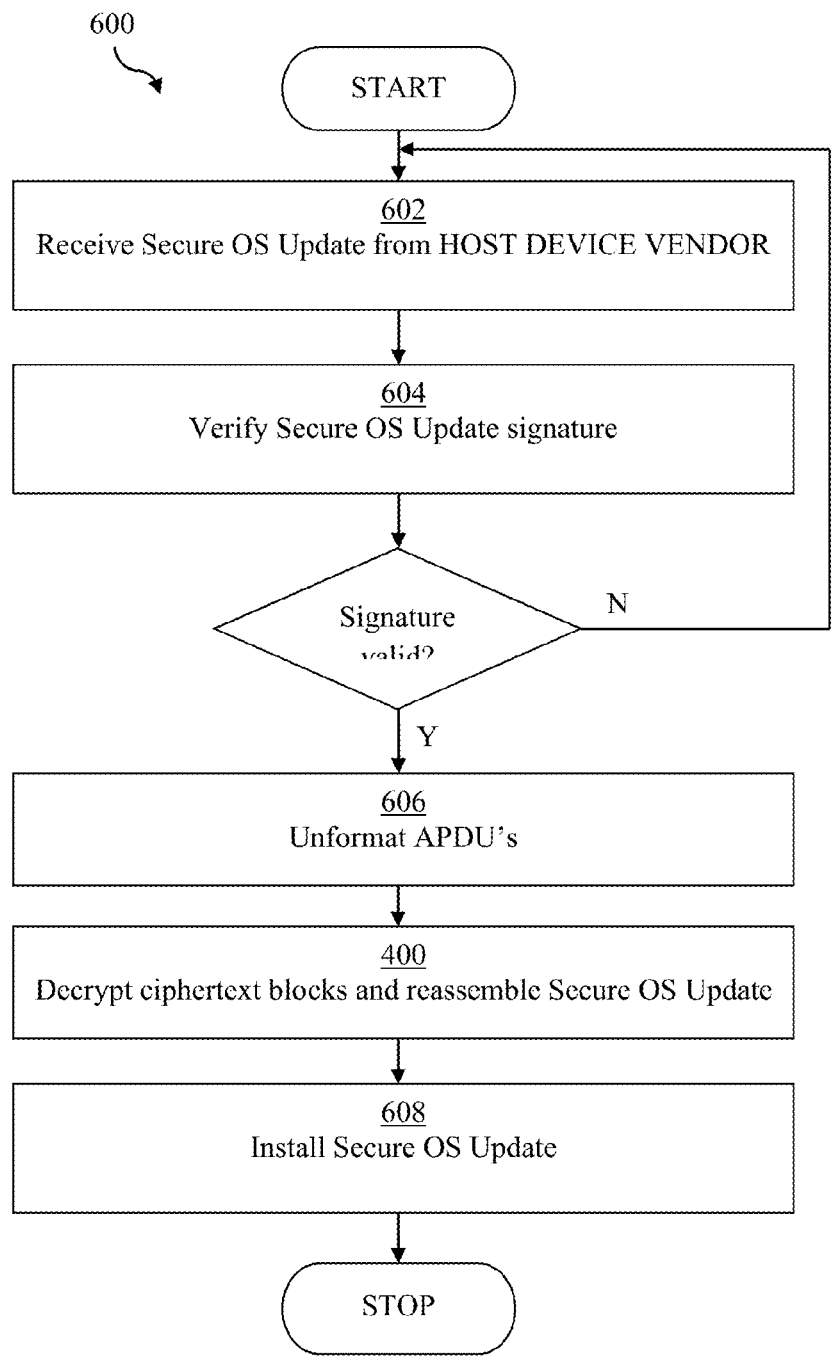
FIG. 6 shows an illustrative embodiment of an installation method.

FIG. 6 shows an illustrative embodiment of an installation method. As a first step of the installation method 600, the host device 102 receives 602 a Secure OS update from the host device vendor 108. Subsequently, the Secure OS update signature is verified 604. For example, the signature may have been generated using a private key, and the secure element 106 may contain the corresponding public key which shall be used to verify the signature. The signature may have been embedded in or appended to the first APDU of the Secure OS update, in order to avoid that the sequence of APDUs is decrypted in case the signature is not valid. Thereby, security is further enhanced and it is prevented that computing resources are wasted. If the signature is not valid, then the subsequent steps of the installation method 600 will not be performed and the host device 102 waits for a new Secure OS update. Otherwise, the APDUs are unformatted 606 in a next step. Next, the decryption method 400 shown in FIG. 4 is carried out, i.e. the ciphertext blocks are decrypted and the Secure OS update is reassembled. Subsequently, the Secure OS update is installed 608 on the secure element 106. It is noted that the mapping of these steps to the functional units of the host device 102 may take different forms. That is to say, as mentioned above, that the actual decryption steps of the decryption method 400 may for example be performed by the secure element 106, at least partially under the control of the central processing unit 104. The Secure OS update may be received by the central processing unit 104 via a communication unit (not shown) of the mobile device 102. The verification of the signature, the unformatting of the APDUs and the installation of the Secure OS update may involve both the central processing unit 104 and the secure element 106. In order to achieve a high level of security, the secure element 106 preferably performs most of the operations necessary to carry out these steps. In order to perform such operations, the secure element 106 may also include a processing unit (not shown).

Figure 7:
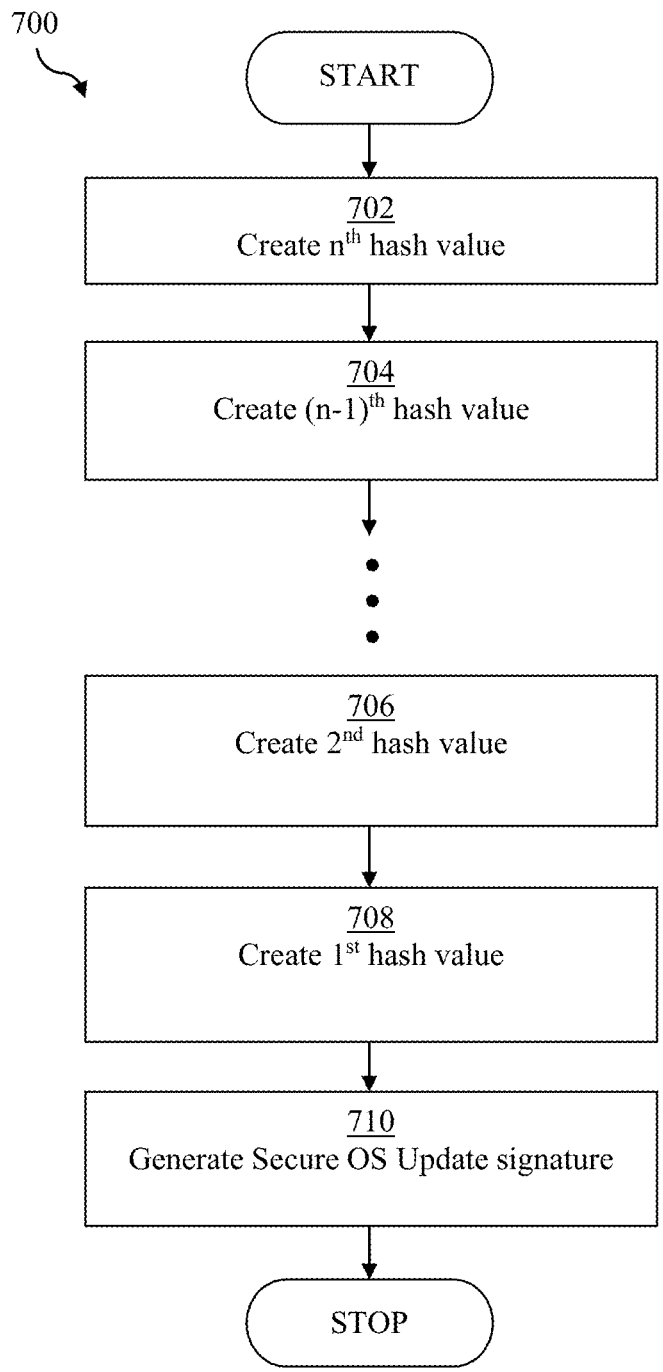
FIG. 7 shows an illustrative embodiment of a signing method.

FIG. 7 shows an illustrative embodiment of a signing method. The signing method 700 is an example of a method for generating the Secure OS Update signature. As a first step, an $n^{th}$ hash value is created 702 by hashing the $n^{th}$ ciphertext block. Subsequently, an $(n-1)^{th}$ hash value is created 704 by concatenating the $(n-1)^{th}$ ciphertext block and the $n^{th}$ hash value and by hashing the result of this concatenation. This is repeated until all ciphertext blocks have been processed. Thus, in the final steps, a second hash value is created 706 by concatenating the second ciphertext block and a third hash value and by hashing the result of this concatenation. Subsequently, a first hash value is created 708 by concatenating the first ciphertext block and the second hash value and by hashing the result of this concatenation. Finally, the Secure OS update signature is generated 710 by concatenating the root ciphertext block and the first hash value and by signing the result of this concatenation, for example by means of a cryptographic function that takes a private key of a public-private key pair as an input.

Figure 8A:
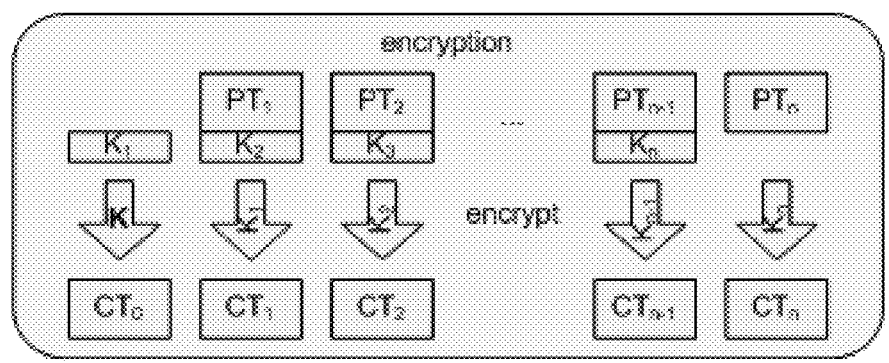
FIG. 8A shows an illustrative embodiment of a chained encryption scheme.
Figure 8B:
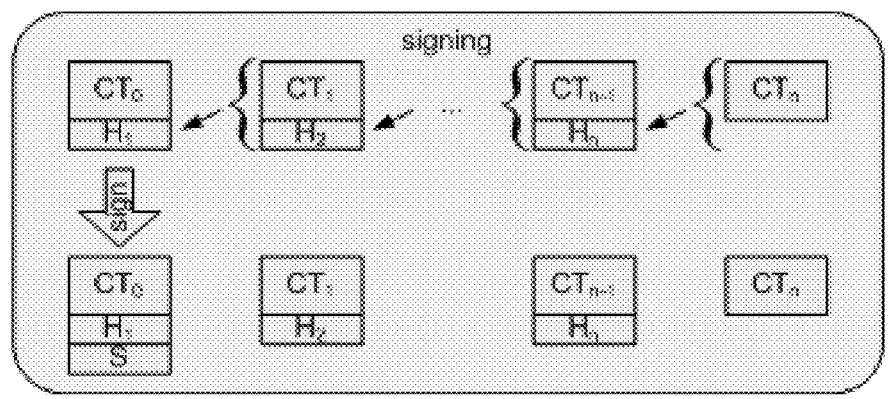
FIG. 8B shows an illustrative embodiment of a chained signing scheme.

FIG. 8A shows an illustrative embodiment of a chained encryption scheme. FIG. 8B shows an illustrative embodiment of a chained signing scheme. These figures further elucidate the encryption method 300 shown in FIG. 3 and the signing method 700 shown in FIG. 7, respectively.

It is noted that a host device may be interpreted in a broad sense so as to include, for example, smart cards. Accordingly, a method in accordance with the present disclosure may also be used to advantage in a smart card, in order to facilitate the installation of software updates on a secure element embedded in such a smart card.

It is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 computing system
102 host device
104 central processing unit
106 secure element
108 host device vendor
110 trusted service manager
112 secure element issuer
200 computing system
300 encryption method
302 encryption method step
304 encryption method step
306 encryption method step
308 encryption method step
310 encryption method step
312 encryption method step
400 decryption method
402 decryption method step
404 decryption method step
406 decryption method step
408 decryption method step
410 decryption method step
412 decryption method step
500 communication method
502 communication method step
504 communication method step
600 installation method
602 installation method step
604 installation method step
606 installation method step
608 installation method step
700 signing method
702 signing method step
704 signing method step
706 signing method step 708 signing method step
710 signing method step

The invention claimed is:

1. A method of installing a software update on a secure element comprised in a host device, the method comprising:
receiving, by the host device, a sequence of ciphertext blocks representing the software update according to a chained encryption scheme, wherein every key is used only once in the chained encryption scheme;
verifying a signature in the sequence of ciphertext blocks, wherein the signature was generated by hashing a last ciphertext block to create a last hash value, creating each successive hash value by concatenating a respective ciphertext block with a next hash value and the hashing the resulting concatenation, and concatenating a root ciphertext block with a first hash value and signing a result of this concatenation to create the signature;
after verifying the signature, converting said sequence of ciphertext blocks into the software update;
extracting a plaintext block that comprises a part of the software update from each ciphertext block of the sequence, except a first ciphertext block;
decrypting each respective ciphertext block with a key that is comprised in a previous ciphertext block of the sequence of ciphertext blocks; and
installing the software update on the secure element.

2. The method as claimed in claim 1, wherein said sequence of ciphertext blocks is integrated into the software update for the host device.

3. The method as claimed in claim 1, wherein said sequence of ciphertext blocks is extracted from the software update for the host device.

4. A method of installing a software update on a secure element comprised in a host device, the method comprising:
receiving, by the host device, a sequence of ciphertext blocks representing the software update according to a chained encryption scheme, wherein every key is used only once in the chained encryption scheme;
verifying a signature in the sequence of ciphertext blocks, wherein the signature was generated by hashing a last ciphertext block to create a last hash value, creating each successive hash value by concatenating a respective ciphertext block with a next hash value and the hashing the resulting concatenation, and concatenating a root ciphertext block with a first hash value and signing a result of this concatenation to create the signature;
after verifying the signature, converting said sequence of ciphertext blocks into the software update;
extracting a plaintext block that comprises a part of the software update from each ciphertext block of the sequence, except a first ciphertext block, wherein, before extracting the plaintext block from each ciphertext block except the first ciphertext block, the first ciphertext block is decrypted with a root key in order to unlock a key for decrypting a second ciphertext block of the sequence of ciphertext blocks; and
installing the software update on the secure element.

5. A host device comprising a secure element, said host device being configured to receive a sequence of ciphertext blocks representing a software update according to a chained encryption scheme wherein every key is used only once in the chained encryption scheme, verify a signature in the sequence of ciphertext blocks, wherein the signature was generated by hashing a last ciphertext block to create a last hash value, creating each successive hash value by concatenating a respective ciphertext block with a next hash value and the hashing the resulting concatenation, and concatenating a root ciphertext block with a first hash value and signing a result of this concatenation to create the signature, after verifying the signature, converting the sequence of ciphertext blocks into the software update, extracting a plaintext block that comprises a part of the software update from each ciphertext block of the sequence, except a first ciphertext block, decrypting each respective ciphertext block with a key that is comprised in a previous ciphertext block of the sequence of ciphertext blocks, and installing the software update on the secure element.

* * * * *